Nov. 17, 1964 — L. BLUM — 3,157,378
FASTENER ASSEMBLY
Filed Dec. 18, 1961 — 2 Sheets-Sheet 1
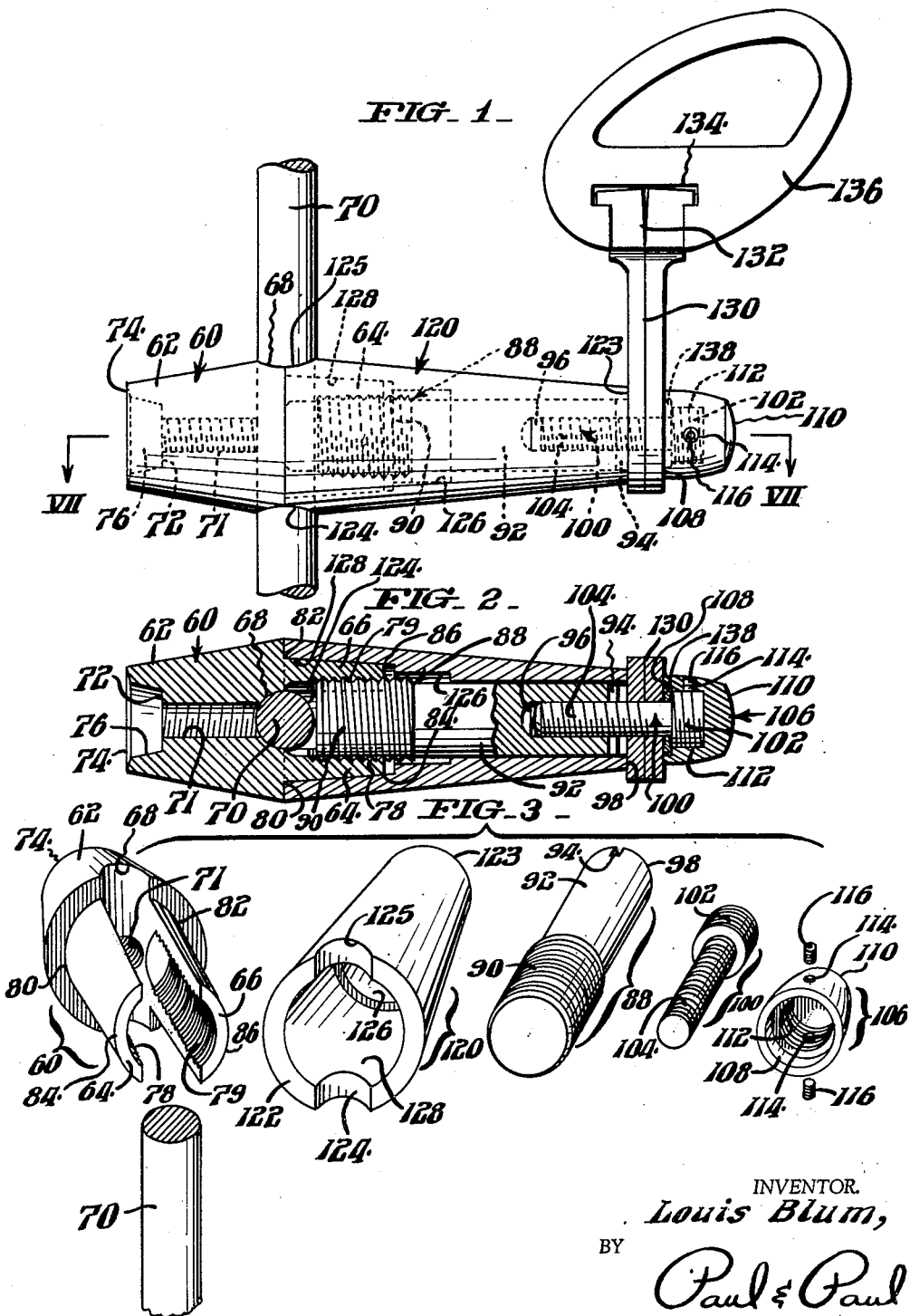
INVENTOR.
Louis Blum,
BY Paul & Paul
ATTORNEYS.

Nov. 17, 1964  L. BLUM  3,157,378
FASTENER ASSEMBLY
Filed Dec. 18, 1961  2 Sheets-Sheet 2

INVENTOR.
Louis Blum,
BY
Paul & Paul
ATTORNEYS.

United States Patent Office 3,157,378
Patented Nov. 17, 1964

3,157,378
FASTENER ASSEMBLY
Louis Blum, Pittsburgh, Pa., assignor to Blumcraft of
Pittsburgh, Pittsburgh, Pa., a firm
Filed Dec. 18, 1961, Ser. No. 160,012
9 Claims. (Cl. 248—230)

This invention relates to railing structure. More particularly, this invention relates to fastener assemblies adapted for use in the construction of railing and similar structure.

It is another object of this invention to provide a fastener assembly for the support of railing structure having component parts which may be easily and quickly assembled with the use of a minimum number of additional fastening elements and the like.

It is another object of this invention to provide a fastener assembly for the support of railing structure which may be economically and quickly produced and which is yet both durable and sturdy.

It is another object of this invention to provide a fastener assembly which is adapted to use with a plurality of vertical posts for the support of railings and the like at selected heights above the bases of said posts.

It is another object of this invention to provide a fastener assembly for use with a plurality of vertical posts which is adapted to support railings and the like at any predetermined angle relative to said posts.

It is another object of this invention to provide a fastener assembly for railing structures and the like which is adapted for the support of ornamental adjuncts to such structures.

Other objects and attendant advantages of the invention will become more fully apparent hereinafter and in the drawings wherein:

FIG. 1 is a view in end elevation of a fastener assembly as provided in accordance with this invention;

FIG. 2 is a sectional view of the fastener taken as indicated by the lines and arrows VII—VII of FIG. 1;

FIG. 3 is a perspective view of component parts of the modified fastener; and

Figure 4:
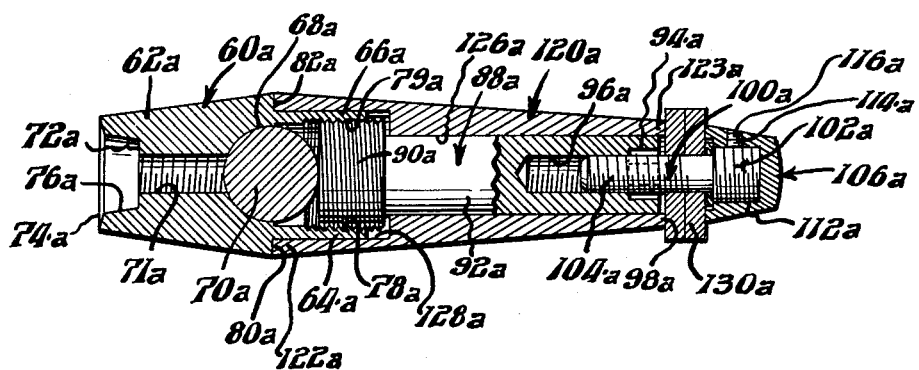
FIG. 4 is a view similar to FIG. 2 of a modification of the fastener assembly.

The following description is directed to the specific form of the invention illustrated in the drawings and is not intended to limit the scope of the invention itself which may be practiced in a wide variety of forms and arrangements.

In the form of the invention illustrated in FIGS. 1–3 the fastener assembly comprises a generally U-shaped clamp member 60 having a frusto-conical cap 62 and prongs 64 and 66 extending from the base thereof. As may be seen in FIG. 2, the exterior surfaces of the prongs 64 and 66 taper inwardly from the base of the frusto-conical cap 62 to the free ends thereof. Formed in the base of the frusto-conical cap portion 62 of the clamp member 60 is a semi-circular indentation 68 dimensioned to fit the curve of a post 70. A tapped bore 71 is provided in the frusto-conical cap portion of the clamp member 60 which extends through the member centrally from the indentation 68 to a terminal point 72 short of the narrow end of the clamp member. Formed in the narrow end 74 of the clamp member is a counterbore 76 communicating with the tapped bore 71. The prongs 64 and 66 are threaded on the interior surface thereof respectively, with threads 78 and 79 and, as may best be seen in FIG. 2, the prongs 64 and 66 respectively, taper from their respective bases 80 and 82 to the respective free ends 84 and 86 thereof. A bolt member 88 is provided with an exteriorly threaded portion 90 and a smooth portion 92 of narrower diameter having formed in the end thereof a slot 94. A tapped hole 96 is also provided axially in the bolt member 88 at the end 98 of the portion 92 thereof. A second bolt member 100 is provided with a threaded portion 102 and a longer threaded portion 104 of narrower diameter. The portion 104 of the bolt 100 is threaded to correspond to the threads of the tapped hole 96 in the bolt member 88 and is of dimension to be received therein. A hollow cap member 106 having an open end 108 and a closed end 110 is provided with threads 112 on the interior surface thereof which threads correspond to the threads of the portion 102 of the bolt 100 which is adapted to be received in the cap member 106. Threaded holes 114 are provided in diametrically opposing sides of cap portion 106 for the reception therein of tightening screws 116.

A sleeve member 120 is provided having a relatively wide diameter at one end 122 thereof and a smaller diameter at the opposite end 123 thereof. The sleeve member tapers smoothly between the aforesaid ends. Formed in the annular end 122 of the sleeve member 120 are semi-circular indentations 124 and 125 having a curvature to match the curvature of the post 70. Interior of the sleeve 120 is a smooth bore 126 and a smooth counterbore 128 adjacent the end 122 of wider diameter. Between the end 123 and the cap 106 is positioned a support section 130 having a T-shaped head 132 adapted to be received into a correspondingly T-shaped slot 134 in a railing 136.

As may be seen in FIG. 2, the sleeve 120 is adapted to fit over the prongs 64 and 66 of the clamp element 60 and the bolt 88 is adapted to be contained in the bore of the sleeve 120 and to screw into the threads 78 and 79 on the interior surface of the prongs 64 and 66 respectively. A lock washer 138 is positioned between the portion 102 of the bolt 100 and the section 130 which supports the rail 136.

In the modified form of the invention illustrated in FIGURE 4, the fastener assembly comprises a generally U-shaped clamp member 60a having a frusto-conical cap 62a and prongs 64a and 66a extending from the base thereof. As may be seen in FIGURE 4, the exterior surfaces of the prongs 64a and 66a extend outwardly perpendicularly from the base of the frusto-conical cap 62a to the free ends thereof. Formed in the base of the frusto-conical cap portion 62a of the clamp member 60a is a semi-circular indentation 68a dimensioned to fit the curve of a post 70a. A tapped bore 71a is provided in the frusto-conical cap portion of the clamp member 60a which extends through the member centrally from the indentation 68a to a terminal point 72a short of the narrow end of the clamp member. Formed in the narrow end 74a of the clamp member is a counterbore 76a communicating with the tapped bore 71a. The prongs 64a and 66a are threaded on the interior surfaces thereof respectively, with threads 78a and 79a and, as may be seen in FIGURE 4, the prongs 64a and 66a are of substantially uniform thickness from the respective bases 80a and 82a thereof to the respective free ends 84a and 86a thereof. A bolt member 88a is provided with an exteriorly threaded portion 90a and a smooth portion 92a of narrower diameter having formed in the end thereof a hexagonal socket 94a. A tapped hole 96a is also provided axially in the bolt member 88a at the end 98a of the portion 92a thereof which opens into the hexagonal socket 94a. A second bolt member 100a is provided with a threaded portion 102a and a longer threaded portion 104a of narrower diameter. The threaded portion 104a of the bolt 100a is threaded to correspond to the threads of the tapped hole 96a in the bolt member 88a and is of dimension to be received therein. A hollow cap member 106a is provided with threads 112a on the interior surface thereof which threads correspond to the threads of the portion 102a of the bolt 100a which is adapted to be received in the cap member 106a. A threaded hole 114a is provided in the side of the cap portion 106a for the reception therein of tightening screws 116a. A sleeve member 120a is provided having a relatively wide diameter at one end 122a thereof and a smaller diameter at the opposite end 123a thereof. The sleeve member 120a tapers smoothly on the exterior surface thereof between the aforesaid ends. Formed in the annular end 122a of the sleeve member 120a are semi-circular indentations having a curvature to match the curvature of the post 70. Interior of the sleeve 120a is a smooth bore 126a dimensioned to receive the smooth portion 92a of narrower diameter of the bolt member 88a. A smooth counterbore 128a is formed adjacent the end 122a of wider diameter of the sleeve 120a and dimensioned to receive the prongs 64a and 66a. The counterbore 128a is of uniform diameter and extends from the end of the bore 126a to the open end 122a of larger diameter of the sleeve member 120a. Between the end 123a and the cap 106a is positioned a support section 130a for the support of a railing not shown.

As may be seen in FIGURE 4, the sleeve member 120a is adapted to fit over the prongs 64a and 66a of the clamp element 60a and the bolt 88a is adapted to to be contained in the bore of the sleeve 120a and to screw into the threads 78a and 79a on the interior surface of the prongs 64a and 66a, respectively.

In assembling the form of fastener assembly shown in FIGS. 1–3, the post 70 is inserted between the prongs 64 and 66 of the clamp element 60 to rest in the indentation 68. The clamp element 60 is adjusted to the desired height on the post 70. Thereafter the bolt 88 is inserted between the prongs 64 and 66 at the threaded portion 90 thereof so that the threads 78 and 79 of the prongs 64 and 66 engage the threads of the bolt 88 and thereafter the bolt is turned manually until the bolt has entered the space between the prongs 64 and 66 a sufficient distance to become just tight therein. Thereafter the sleeve 120 is slid over the bolt 88 and the prongs 64 and 66 and the indentations 124 and 125 are aligned with the indentation 68 in the clamp member 60 so that the indentations are filled by the post 70. With the sleeve in position as aforedescribed, a suitable instrument is inserted into the slot 94 of the bolt 88 and the bolt is further tightened to cause the prongs 64 and 66 to move outward as the threaded portion 90 of the bolt moves inwardly of the clamp element 60 toward the post 70. When the bolt 88 has been firmly tightened in the tapering prongs 64 and 66 which tend to flare outwardly against the sleeve 120 thereby holding the sleeve in position, support section 130 is positioned adjacent the end 123 of the sleeve 120 and the bolt 100 is inserted through the support section 130 and into the tapped bore 96 in the bolt 88. Thereafter the bolt 100 is tightened against the lock washer 138 thereby fully securing support section 130 in the desired position. When the railing support section 130 has been positioned as aforedescribed, the cap 106 is then screwed onto the section 102 of the bolt 100 so that the cap rests tightly against the support section 130, and thereafter screws 116 are inserted into the diametrically opposed threaded holes 114 in the cap 106 and tightened to retain the cap in position on the end of the bolt 100.

It will be appreciated that the modification of the fastener assembly illustrated in FIGURE 4 is assembled in substantially the same manner as previously described.

It will be apparent that it is an important advantage of the invention as aforedescribed that a railing structure is provided thereby which may be assembled easily and quickly with the use of a minimum number of fastening elements and the like.

Still another important feature of the invention resides in the manner of construction thereof in which a fastening assembly is provided for a railing structure whereby a handrail and the like may be used with a plurality of vertical posts and arranged for support thereby at any predetermined angle relative to the aforesaid posts.

Although this invention has been described with reference to specific forms and embodiments thereof, it should be evident that a great number of variations may be made without departing from the spirit and scope of this invention. For example, parts may be reversed, equivalent elements may be substituted for those specifically disclosed and certain features of the invention may be used independently of other features, all without departing from the spirit and scope of this invention defined in the appended claims.

I claim:

1. A fastener assembly adapted for attachment to a post of a railing structure comprising a generally U-shaped member adapted to fit against the side of a post received through the open end thereof, a bolt threadedly received between the legs of said member and extending therefrom in longitudinal continuation thereof, the threaded end of said bolt being adapted for engaging the side of said post thereby to affix said member to said post, a sleeve fitted over said bolt and abutting said member, and means at the opposite end of said bolt for securing a railing component thereto.

2. A fastener assembly adapted for attachment to a post of a railing structure comprising a generally U-shaped member adapted to fit against the side of a post received through the open end thereof, a bolt threadedly received between the legs of said member and extending therefrom in longitudinal continuation thereof, the threaded end of said bolt being adapted for engaging the side of said post thereby to affix said member to said post, the legs of said member being provided externally with tapering surfaces, a sleeve fitted over said bolt and having the legs of said member telescoped into one end thereof, and means at the opposite end of said bolt for securing a railing component thereto.

3. A fastener assembly adapted for attachment to a post of a railing structure comprising a generally U-shaped member adapted to fit against the side of a post received through the open end thereof, a bolt threadedly received between the legs of said member and extending therefrom in longitudinal continuation thereof, the threaded end of said bolt being adapted for engaging the side of said post thereby to affix said member to said post, the legs of said member being provided externally with tapering surfaces, a radially outwardly extending annular shoulder at the base of said tapering surfaces, a sleeve fitted over said bolt and having the legs of said member telescoped into, and said annular shoulder abutting, one end thereof, and means at the opposite end of said bolt for securing a railing component thereto.

4. A fastener assembly adapted for attachement to a post of a railing structure comprising a generally U-shaped member adapted to fit against the side of a post received through the open end thereof, a bolt threadedly received between the legs of said member and extending therefrom in longitudinal continuation thereof, the threaded end of said bolt being adapted for engaging said post thereby to secure said member against movement longitudinally thereof, the legs of said member being provided externally with tapering surfaces, a radially outwardly extending annular shoulder at the base of said tapering surfaces, a sleeve fitted over said bolt and having the legs of said member nested in, and said annular shoulder abutting, one end thereof, said sleeve end being adapted to fit against the side of said post opposite said member, and means at the opposite end of said bolt for securing a railing component thereto.

5. A fastener assembly adapted for attachment to a post of a railing structure comprising a generally U-shaped member adapted to fit against the side of a post received through the open end thereof, a bolt threadedly received between the legs of said member and extending therefrom in longitudinal continuation thereof, the threaded end of said bolt being adapted for engaging said post thereby to secure said member against movement longitudinally thereof, the legs of said member being provided externally with tapering surfaces, a sleeve fitted over said bolt and having the legs of said member nested in one end thereof, and means carried by the opposite end of said bolt for clamping a railing component to the opposite end of said sleeve.

6. A fastener assembly adapted for attachment to a post of a railing structure comprising a generally U-shaped member adapted to fit against the side of a post received through the open end thereof, the legs of said member being substantially uniform in transverse section, a bolt threadedly received between the legs of said member and extending therefrom in longitudinal continuation thereof, the threaded end of said bolt being adapted for engaging the side of said post thereby to affix said member to said post, a sleeve fitted over said bolt and having the legs of said member telescoped into one end thereof, and means at the opposite end of said bolt for securing a railing component thereto.

7. A fastener assembly adapted for attachment to a post of a railing structure comprising a generally U-shaped member adapted to fit against the side of a post received through the open end thereof, the legs of said member being substantially uniform in transverse section, a radially outwardly extending annular shoulder at the base of said legs, a bolt threadedly received between the legs of said member and extending therefrom in longitudinal continuation thereof, the threaded end of said bolt being adapted for engaging the side of said post thereby to affix said member to said post, a sleeve fitted over said bolt and having the legs of said member telescoped into, and said annular shoulder abutting one end thereof, and means at the opposite end of said bolt for securing a railing component thereto.

8. A fastener assembly adapted for attachment to a post of a railing structure comprising a generally U-shaped member adapted to fit against the side of a post received through the open end thereof, the legs of said member being substantially uniform in transverse section, a radially outwardly extending annular shoulder at the base of said legs, a bolt threadedly received between the legs of said member and extending therefrom in longitudinal continuation thereof, the threaded end of said bolt being adapted for engaging one side of said post thereby to affix said member to said post, a sleeve fitted over said bolt and having the legs of said member telescoped into, and said annular shoulder abutting one end thereof, said sleeve end being adapted to fit against the side of said post opposite side member, and means at the opposite end of said bolt for securing a railing component thereto.

9. A fastener assembly adapted for attachment to a post of a railing structure comprising a generally U-shaped member adapted to fit against the side of a post received through the open end thereof, the legs of said member being substantially uniform in transverse section, a bolt threadedly received between the legs of said member and extending therefrom in longitudinal continuation thereof, the threaded end of said bolt being adapted for engaging one side of said post thereby to affix said member to said post, a sleeve fitted over said bolt and having the legs of said member telescoped into one end thereof, and means carried by the opposite end of said bolt for clamping a railing component to the opposite end of said sleeve, and means at the opposite end of said bolt for securing a railing component thereto.

References Cited in the file of this patent

UNITED STATES PATENTS

| 2,088,481 | Mylins | July 27, 1937 |
| 3,007,678 | Buehler | Nov. 7, 1961 |

FOREIGN PATENTS

| 967,109 | France | Mar. 22, 1950 |